(12) United States Patent
Ciferno (10) Patent No.: US 12,091,306 B2
(45) Date of Patent: Sep. 17, 2024

(54) FLUID DELIVERY SYSTEM

(71) Applicant: John A. Ciferno, Lower Burrell, PA (US)

(72) Inventor: John A. Ciferno, Lower Burrell, PA (US)

( * ) Notice: Subject to any disclaimer, the term of this patent is extended or adjusted under 35 U.S.C. 154(b) by 0 days.

(21) Appl. No.: 17/592,359

(22) Filed: Feb. 3, 2022

(65) Prior Publication Data

US 2022/0306448 A1    Sep. 29, 2022

Related U.S. Application Data

(60) Provisional application No. 63/200,707, filed on Mar. 23, 2021.

(51) Int. Cl.
*B67D 7/04* (2010.01)
*B67D 7/32* (2010.01)

(52) U.S. Cl.
CPC ............. *B67D 7/04* (2013.01); *B67D 7/3209* (2013.01); *B67D 7/3218* (2013.01)

(58) Field of Classification Search
CPC ...... B67D 7/04; B67D 7/3209; B67D 7/3218; B67D 7/3227; B67D 7/3245
See application file for complete search history.

(56) References Cited

U.S. PATENT DOCUMENTS 4,485,010 A * 11/1984 Strauss .................... F16K 1/221
  251/59
7,240,812 B2 * 7/2007 Kamikozuru ......... B60P 3/2245
  222/627

* cited by examiner

*Primary Examiner* — Paul J Gray
(74) *Attorney, Agent, or Firm* — Matthew W. Gordon (57) ABSTRACT

Fluid delivery vehicles, such as water trucks, and fluid receiving units for use at well sites, storage facilities, treatment facilities, rail and barge terminals are disclosed. The fluid delivery vehicle has primary fluid discharge assembly downwardly extending from a tank on the fluid delivery vehicle for discharge of fluid into a fluid containment unit configured to contain a larger volume of fluid than the tank arranged below the fluid delivery vehicle.

10 Claims, 8 Drawing Sheets

FLUID DELIVERY SYSTEM

PRIORITY CLAIM

This application claims the benefit of prior provisional U.S. application Ser. No. 63/200,707 for a Fluid Delivery System filed Mar. 23, 2021.

FIELD OF THE INVENTION

The present invention relates to vehicle based fluid delivery systems. More particularly, the present invention related to offloading of fluid at well sites, treatment facilities, storage facilities, disposal sites, terminals for rail and barge. More particularly, the present invention relates to delivery of water to and from well sites utilizing hydraulic fracturing. Additionally, the present invention relates to a method of using a vehicle to deliver fluid to a receiving unit.

BACKGROUND INFORMATION

Hydraulic fracturing (fracking) is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly pressurized fracking fluid creates new channels in the rock which can increase the extraction rates and ultimate recovery of fossil fuels. The fracture width is typically maintained after the injection by introducing a proppant into the injected fluid.

A typical preliminary step in preparing a frack job is transporting a large volume of water ("frack water") from a water source to a to a well site. Frack water is often stored in a frack pit, a frack tank, AST (above ground storage tank) or a work tank at the site. Well operations require large volumes of water to sustain the drilling and fracking processes. This demand is often met by trucking water to well site.

In conventional designs trucks used for delivery of water to well sites have long discharge times, often 20 to 30 minutes. These discharge times lessen the rate at which well sites can receive water. Beyond the downside associated with these delays is a need for additional trucks to meet demand. Compounding the expense associated with the need for additional trucks is the fact that haulers are often paid hourly and forced to sit long wait lines to unload. Water trucks and receiving units are also configured such that a driver must back up to the receiving unit and manually couple hoses from the truck to the receiving unit. Anytime a truck is required to back up at a busy well site the risk of accident increases and when there is a connection with a hose and pressure is applied there is a chance of an environmental spill caused by operator error or mechanical failure.

SUMMARY OF THE INVENTION

A fluid delivery vehicle is provided that includes a fluid holding container mounted on the vehicle; a vent on an upper portion of the fluid holding container; a primary fluid discharge assembly downwardly extending from the fluid holding container comprising a first discharge port and a first means for opening and closing the primary discharge port; and secondary fluid intake and discharge assembly discharge comprising a secondary discharge port and a means for opening and closing the secondary discharge port.

An aspect of the present invention is to provide a fluid deliver system for a well site including fluid delivery vehicle comprising a fluid holding container mounted on said vehicle; a primary fluid discharge assembly downwardly extending from the fluid holding container comprising a first discharge port and a first means for opening and closing the primary discharge port; a primary fluid containment unit configured to contain a larger volume of fluid than the fluid holding container comprising an upper surface having an opening for receiving fluid from the primary fluid discharge assembly of the fluid delivery vehicle and containment unit discharge assembly.

Another aspect of the present invention is to provide a method of delivering a fluid to a receiving facility comprising driving a fluid delivery vehicle comprising a fluid holding container mounted on said vehicle; a primary fluid discharge assembly downwardly extending from the fluid holding container comprising a primary discharge port and a first means for opening and closing the primary discharge port; to a location on or above a primary fluid containment unit configured to contain a larger volume of fluid than the fluid holding container; the primary fluid containment unit comprising an upper surface having an opening for receiving fluid from the primary fluid discharge assembly of the fluid delivery vehicle and containment unit discharge assembly; then opening the first means for opening and closing the primary discharge port to discharge fluid from the fluid holding container through the opening for receiving fluid in the primary fluid containment unit.

These and other aspects of the present invention will be more apparent from the following description.

DETAILED DESCRIPTION

Figure 1:
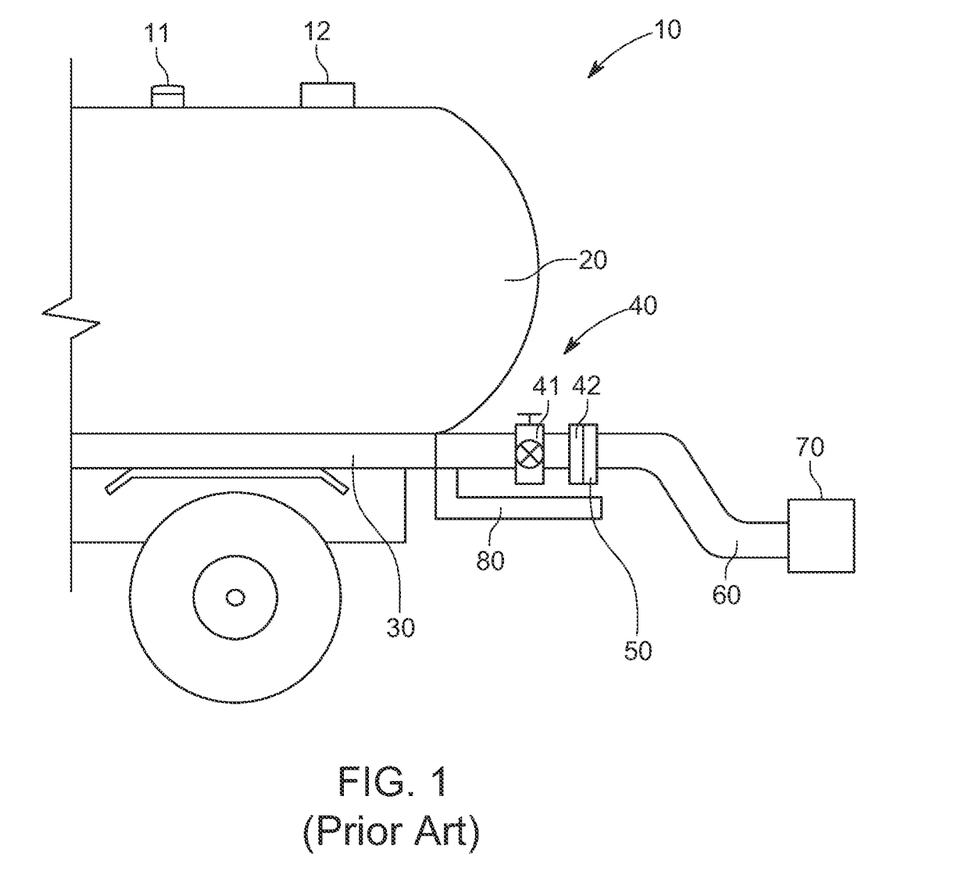
FIG. 1 is an elevation view of a conventional fluid delivery vehicle.

FIG. 1 illustrates a rear portion of conventional fluid delivery vehicle 10 used to deliver and retrieve water from a well site. Fluid delivery vehicles 10 are often trucks made in conformance with federal and state regulations. The trucks typical comprise a rig (not shown), a tank or fluid holding container 20. The fluid holding container is typically mounted on a wheeled frame 30 which is either a single unit with the rig or attached a trailer to the rig or tractor, i.e., a tractor trailer. The fluid holding container 20 may have one or more openings 11 located near the top of the fluid holding container 20 for access, loading or venting. A vacuum pump 12 is also connected to the fluid holding container 20 to pressurize the fluid holding container 20 to aid in fluid discharge or, in reverse, create a vacuum inside the fluid holding container 20 to aid in fluid intake. A fluid intake and discharge assembly 40 is typically situated at a lower, rear portion of the fluid holding container 20. The fluid discharge assembly 40 includes a valve 41 and vehicle coupling 42. Fluid discharge assemblies are generally 4" but can be changed to desired diameter to meet needs of job. Connections to correspond to typical receiving connections at well sites. When delivering or retrieving fluid from a well site a driver will back up to a connection at well site and connect vehicle coupling 42 to site coupling 50 attached to hose 60. Fluid holding container 20 may be emptied by vacuum pump 70 or filled utilizing a vacuum pump on the fluid delivery vehicle 10.

Figure 2:
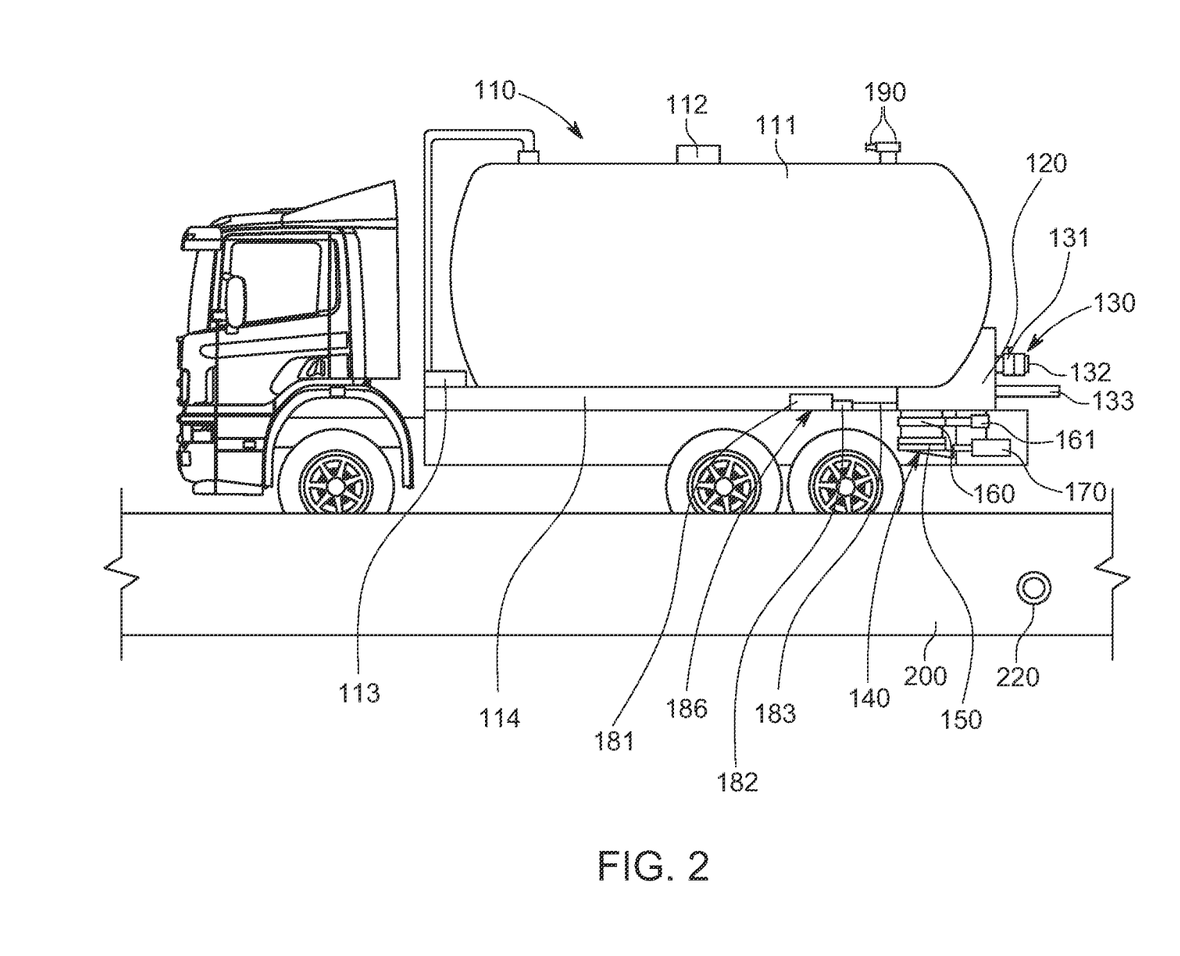
FIG. 2 is an elevation view of a fluid delivery vehicle in accordance with a preferred embodiment of the present invention.

FIG. 2 illustrates a fluid delivery vehicle 110 used to deliver and retrieve water from a well site in accordance with a preferred embodiment of the present invention. The fluid delivery vehicle 110 includes a tank 111 which is a fluid holding container. The tank 111 has an opening 112 arranged near the top of the tank 111 for access or loading. A vent pneumatic actuator 191 and vent 190 are also located near the top of the tank 111. The vent 190 may be any type of valve capable of opening and closing to seal or allow air flow. The tank 111 is also equipped with an air pump 113 for creating pressure or vacuum within the fluid holding container. The tank 111 is mounted on a frame 114. The frame 114 may be a unitary structure also supporting a rig (not shown) or may be part of a trailer towed by a rig, often referred to transport or tractor trailer. A manifold 120 connects a secondary fluid intake and discharge assembly 130 and primary fluid discharge assembly 140 to the tank 111. The secondary fluid intake and discharge assembly 130 includes a shutoff valve 131 and coupling 132. The secondary fluid intake and discharge assembly 130 may be 4-6" in diameter pipes, valves and couplings to accommodate standard well site connections. A drip pan 133 may be included to catch spills at the secondary fluid intake and discharge assembly 130. The primary fluid discharge assembly 140 includes a safety lid 150 and shut off valve 160. The primary fluid discharge assembly 140 has a diameter larger than that of the secondary fluid intake and discharge assembly 130. In a preferred, embodiment the diameter of primary fluid discharge assembly 140 is 10", and most preferably 12". In a preferred embodiment both the safety lid 150 and shut off valve 160 are pneumatically actuated. The safety lid 150 is controlled by a tie rod pneumatic actuator 170. In this case the actuator is a tie rod type actuator but may be another type of pneumatic, mechanical or electrical actuator. The shut off valve 160 is located between the manifold 120 and the safety lid 150. In this embodiment the shut off valve 160 is a butterfly valve actuated by rotary pneumatic actuator 161. The fluid delivery vehicle 110 also has a compressed air system 180 including an air tank 181, a regulator 182 and an air distribution system 183. The air tank 181 is connect by air lines to an air compressor driven by an engine that powers the fluid delivery vehicle 110. The regulator 182 and the air tank 181 are located anywhere they can fit the air holding tanks under the frame of the truck. The compressed air system 180 may be the same system used for compressed air brakes on the fluid delivery vehicle 110. The vent pneumatic actuator 191, tie rod pneumatic actuator 170 and the rotary pneumatic actuator 161 are connected to the air distribution system 183. Control switches (not shown) for the tie rod pneumatic actuator 170 and the rotary pneumatic actuator 161 are preferably located inside the rig within reach of a driver of the fluid delivery vehicle 110. The switches may be pneumatic or electric as desired. In a preferred embodiment, the vent actuator 191 is configured to open and close in upon corresponding and synchronous opening and closing of the tie rod pneumatic actuator. The fluid vehicle 110 may drive upon and discharge fluid into primary fluid containment unit 200. Primary fluid containment unit 200 may have a discharge port 220 for connection to fluid receptacles at the well site. This can be hose or piping connected to pumps to pump fluid to destination or piping to gravity feed to lower lying storage.

Figure 3:
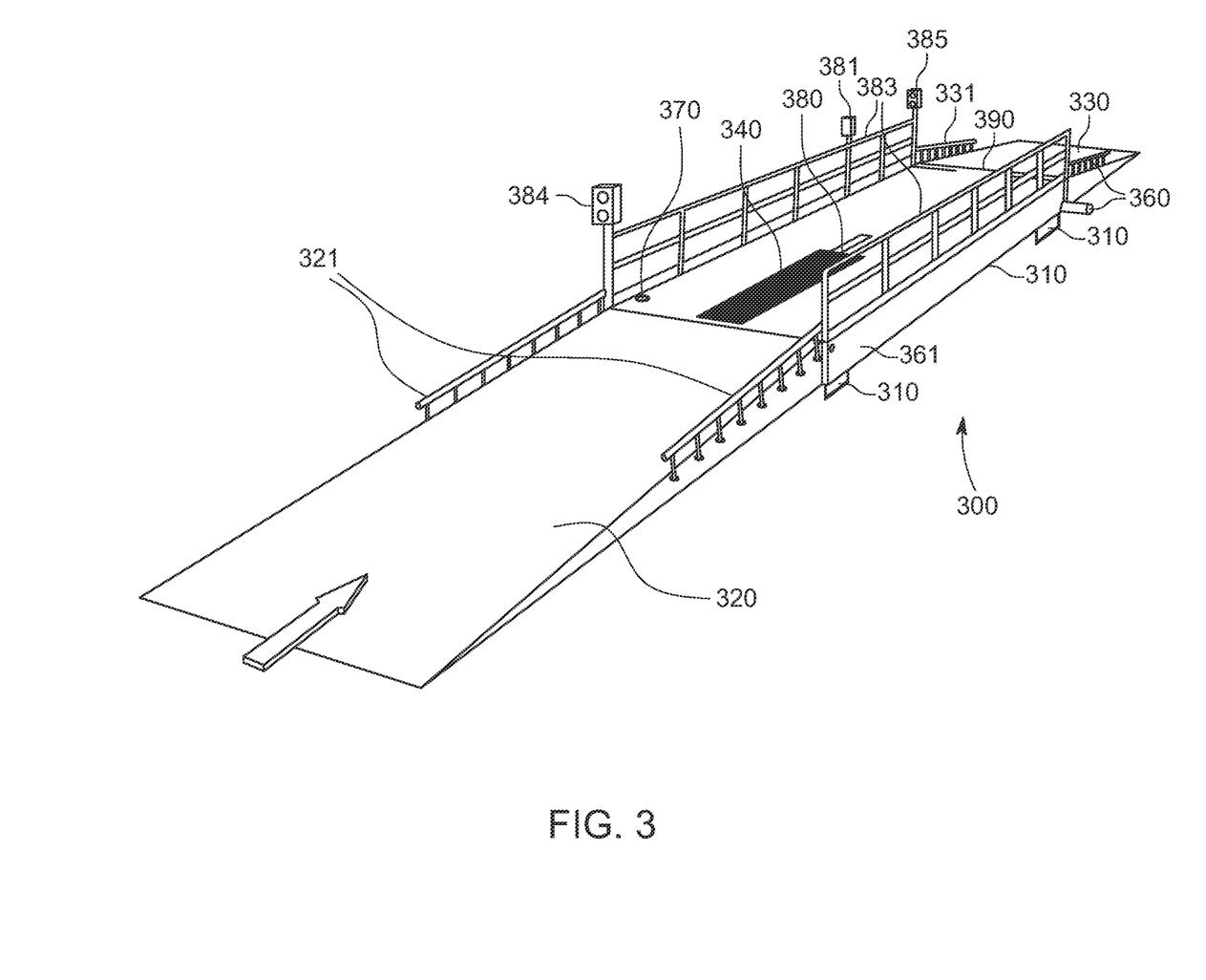
FIG. 3 is an isometric view of a primary fluid containment unit in accordance with a preferred embodiment of the present invention.

Referring now to FIG. 3, a primary fluid containment unit 300 is shown according to a preferred embodiment of the present invention. Primary fluid containment unit 300 has a main body 310 with connected entry ramp 320 and exit ramp 330. The main body 310 has a receiving opening 340 for receiving fluid from the fluid delivery vehicle. The receiving opening 340 may be a grated opening to an internal cavity of the main body. In a preferred embodiment, the main body is 47 feet long, 12 feet wide and 30 inches high but may be configured as necessary to accommodate a vehicle and contain the requirement amount of fluid. The entry ramp 320 and exit ramp 330 may be 30 feet long in a preferred embodiment. The entry ramp 320 and exit ramp 330 may also have a hinged or other type connection to the main body 310 to allow each to be folded onto the main body 310 for transport. The entry ramp 320 and exit ramp 330 may also have guide rails 321, 331. The main body 310 may have safety railing 383. The primary fluid containment unit 300 may include load cells 350 for monitoring weight of the fluid collected and fluid discharged from the unit. The primary fluid containment unit 300 also has at least one discharge port 360 for connection to fluid receptacles at the well site. One or more filters, screens or baffles may be incorporated in the discharge port 360 or on the interior of the main body 310 to filter or screen the fluid prior to discharge at the site. The primary fluid containment unit 300 may have an alternate inlet port 361 to accommodate connection and offload by prior art fluid delivery vehicles without a primary fluid discharge assembly according to the present invention or for a second fluid delivery vehicle according to the present invention to utilize a secondary fluid intake and discharge assembly as described in FIG. 2. A high and low fluid level sensor, for example a float type sensor 370 may be incorporated in the primary fluid containment unit 300 to monitor fluid levels therein. Additional sensor equipment 380 may also be included to monitor fluid delivery traffic. The sensor equipment 380 may include various types of proximity switches, RFID readers or scanners, optical sensors, infrared sensors, or other sensing equipment that may be used in combination with sensing equipment on the fluid delivery vehicle. In this embodiment, the primary fluid containment unit 300 has an approach signal 384 and an exit signal 385 to facilitate the unloading process. Card reader 381 may be installed to provide communication with a card or badge on a vehicle or with a drive. The primary fluid containment unit 300 may be additionally configured with other metering equipment, water tracking equipment, water recording equipment, signaling equipment and audible equipment as needed.

Primary fluid containment units according to the present inventions are designed to be driven on or driven over by a fluid delivery vehicle such as a water truck. In the preferred embodiment shown in FIG. 3 the primary fluid containment unit 300 is designed to accommodate a volume greater than that held in the tank of a corresponding fluid delivery vehicle and possible multiple fluid delivery vehicle tank capacity. The primary fluid containment units may be designed to be transported from site to site thus limited in size to that which can be safely transported. Materials used in the construction of the primary fluid containment units are various steels, aluminum, titanium, alloys of those and other metals, plastics and any other material commonly uses to fabricate similar structures. Primary fluid containment units are designed to be maximize fluid containment volume, reduce container weight and provide structural integrity to support an appropriate gross vehicle weight. For primary fluid containment units designed to be transportable from site to site dimensions are also configured to allow over the road transport in compliance with transportation regulations.

Figure 4:
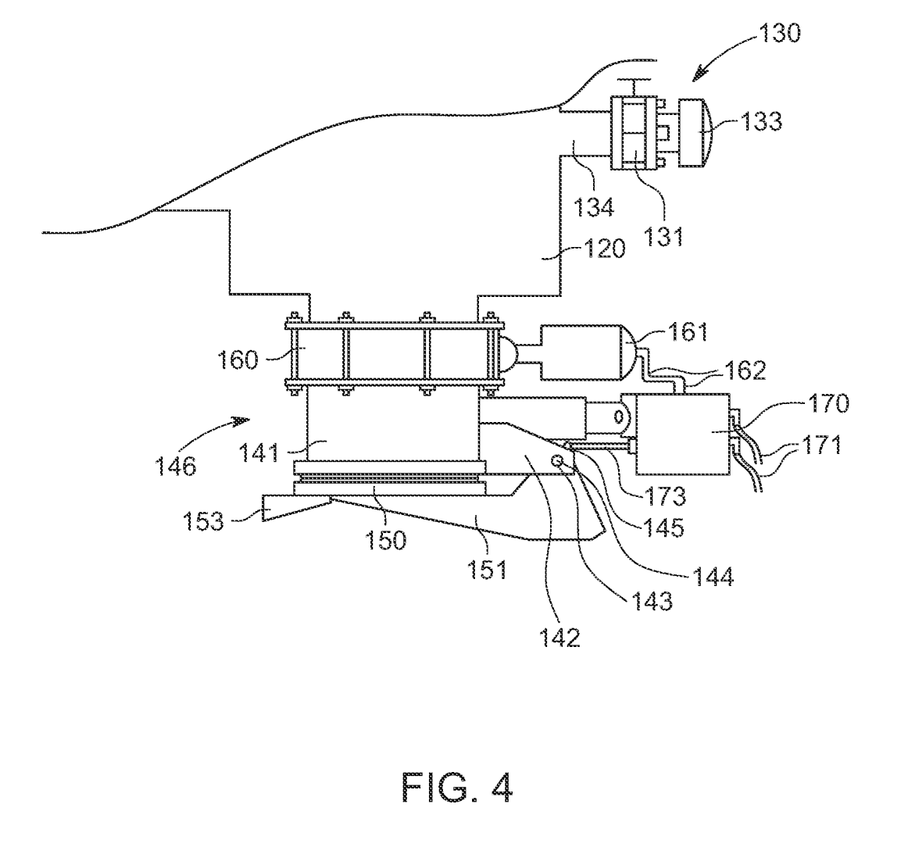
FIG. 4 is a side view of a primary fluid discharge unit of a fluid delivery vehicle in the closed position in accordance with a preferred embodiment of the present.
Figure 5:
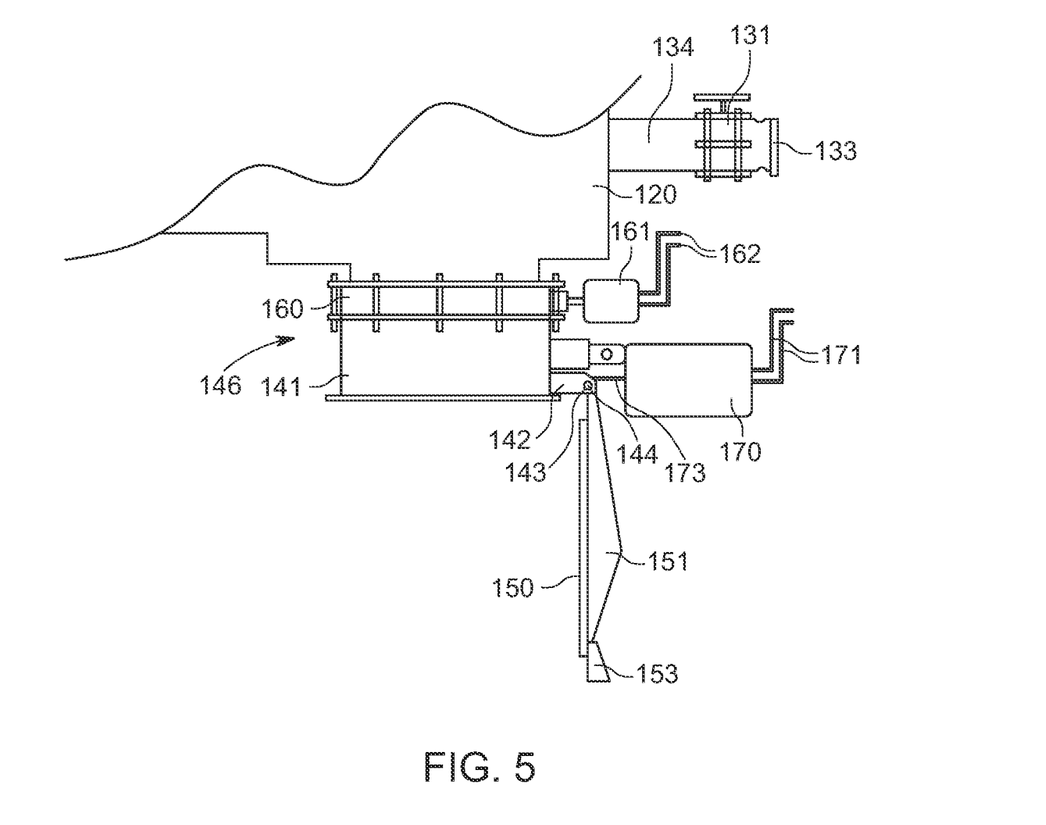
FIG. 5 is a side view of a primary fluid discharge unit of FIG. 4 in an open position.

FIG. 4 and FIG. 5 illustrate an enlarged view of the fluid discharge portion of a tank according to an embodiment of the present invention. Manifold 120 is welded to an opening in the tank. In this fashion existing fluid delivery vehicles may be retrofitted with the present invention. The secondary fluid intake and discharge assembly 130 extends rearwardly from the manifold 120 and connected by pipe 134 to the manifold 120. A valve 131 disposed between the pipe 134 and coupling and covered by cap 133. The primary fluid discharge assembly 140 extends downwardly from the manifold 120. A shut off valve 160 is disposed within pipe 141. Valve 160 and valve 131 may be a butterfly, gate, ball, or other type of valve commonly used for fluid control. Safety lid 150 caps a lower end of the pipe 141. The safety lid 150 is held in place by arm 151. Arm 151 is hinged to bracket 142 by way of opening 143 and shaft 144. Arm 151 is also hinged to a distal end of rod 173. The safety lid is controlled by tie rod pneumatic actuator 170. When arm 173 of tie rod pneumatic actuator 170 extends lever 145 of arm 151 the safety lid 150 opens as is shown in FIG. 5. Pipe 141 is flanged at the connection to safety live 150 and either safety LED 150 or pipe 141 will include a gasket for providing a watertight seal when safety lid 150 is closed.

Still referring to FIG. 4 and FIG. 5, shut off valve 160 is controlled by rotary pneumatic actuator 161. Airlines 162 and 171 power tie rod actuator 170 and Rotary pneumatic actuator 161. To prevent accidental discharge controls are configured to prevent shut off valve 160 from opening without first opening safety lid 150. This may be done electrically or pneumatically. Sensor 153 may be a proximity sensor, RFID tag or transmitter or other sensing device. The sensor 153 may be in communication with a corresponding sensor on a separate receiving unit such as the sensing equipment in FIG. 3. The sensing equipment may be configured to turn pumps on and off, record discharge times, or as otherwise may be useful.

Figure 6:
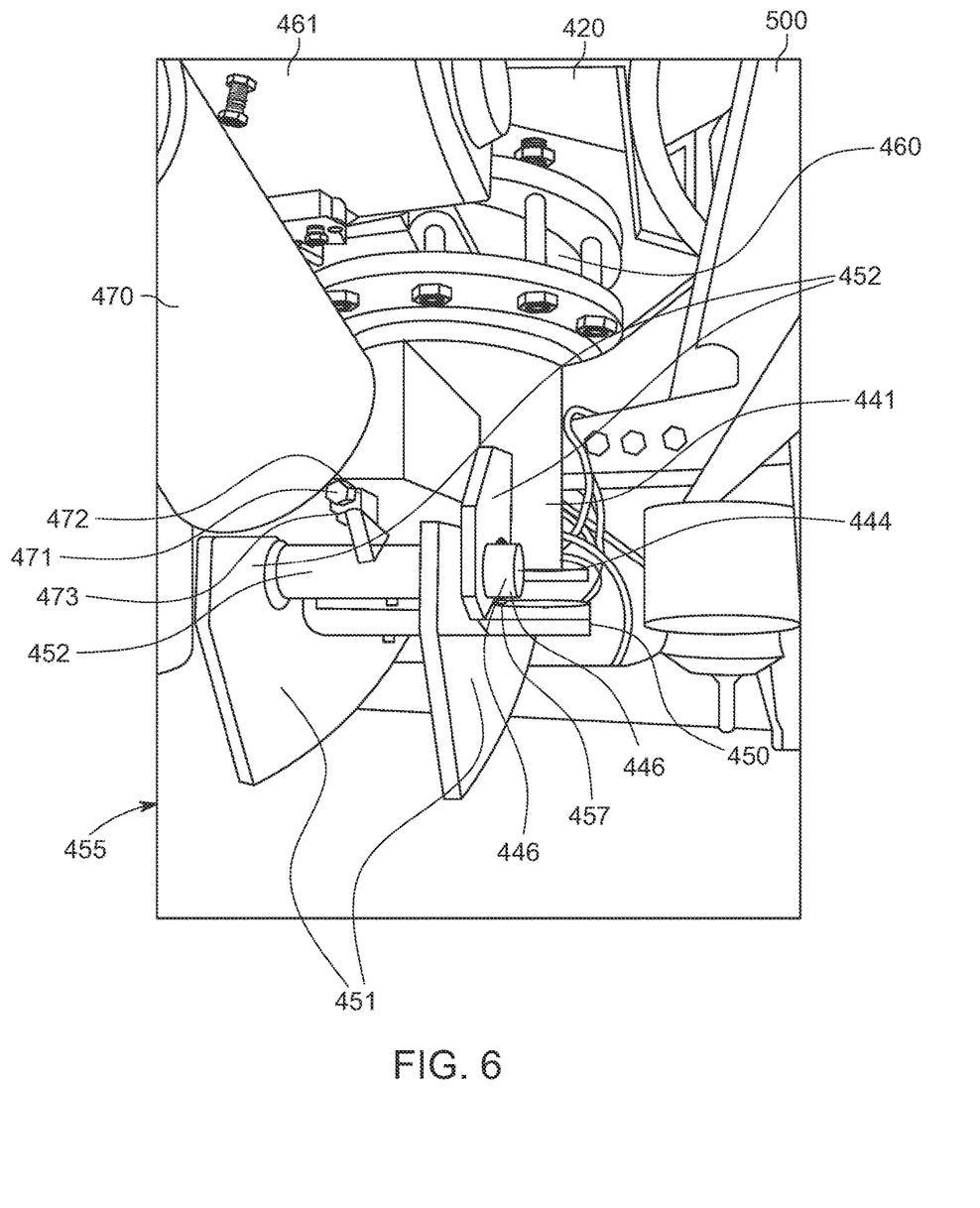
FIG. 6 is a rear perspective view of a primary fluid discharge unit of a fluid delivery vehicle in accordance with a preferred embodiment of the present invention.

Referring now to FIG. 6, a perspective view of a primary fluid discharge unit 440 is shown from the rear of the fluid delivery vehicle. The primary fluid discharge unit 440 extends downwardly from the manifold 420 and includes shutoff valve 460 and safety lid 450. Safety lid 450 is connected 2 tie rod pneumatic cylinder 470 bye arm assembly 455. A bracket 472 is fixed at one end of tie rod 472. A pin 473 connects bracket 472 to lever 453 of arm assembly 455. Lever 453 extends from cylinder 452 which connects arms 451 to the safety lid 450. As in earlier embodiments when tie rod 471 extends from tie rod pneumatic actuator 470 the cylinder 473 rotates and opens the safety lid 450. Brackets 452 are fitted with bearings 457. Shafts 444 extend outwardly from arms 451 and fit within bearings 457. Rotary pneumatic actuator 461 for control of shutoff valve 460 and frame 500 of the fluid delivery vehicle are also shown. In a preferred embodiment the tie rod pneumatic cylinder for 70 and Rotary pneumatic actuator 461 or both spring assisted, fail close type actuators so if compressed air is lost each will automatically close.

Figure 7:
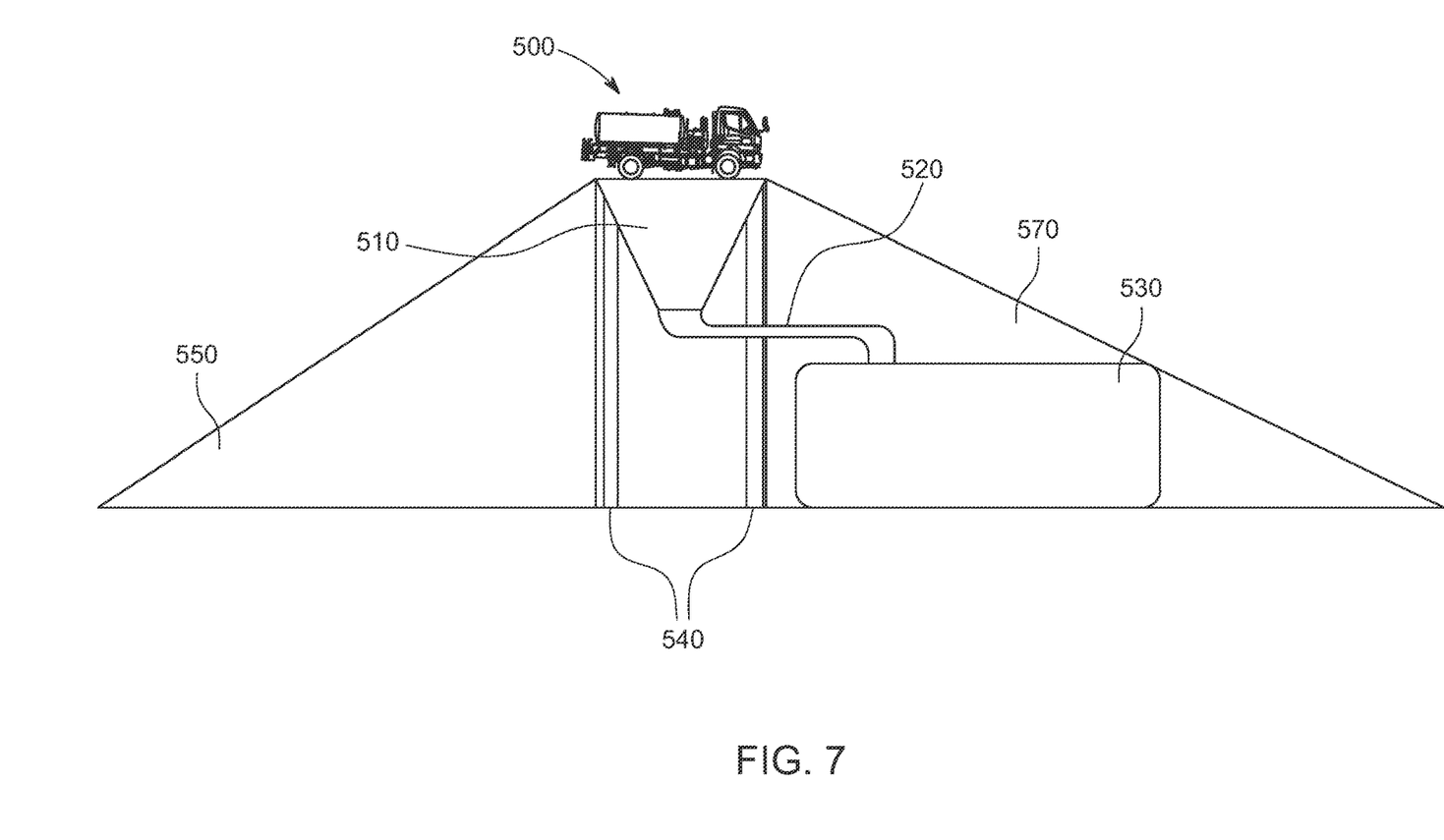
FIG. 7 is an elevation view of a fluid delivery vehicle and primary fluid containment unit in accordance with an alternative embodiment of the present invention.

In one embodiment of the president invention shown in FIG. 7 a fluid delivery vehicle 500 may discharge fluid into a receiving hopper 510. The receiving hopper 510 is arranged at an elevation above primary fluid receiving unit 530 and connected 2 primary fluid receiving unit 535 by duct 520. The receiving hopper may be supported by columns 540 or other structures. Entry ramp 550 and exit ramp 570 provide access for the fluid delivery vehicle 500 to reach receiving hopper 510. Entry ramp 550 an exit ramp 570 may be made of structural materials such as steel or be made of earth, concrete or asphalt or any combination of these.

Figure 8:
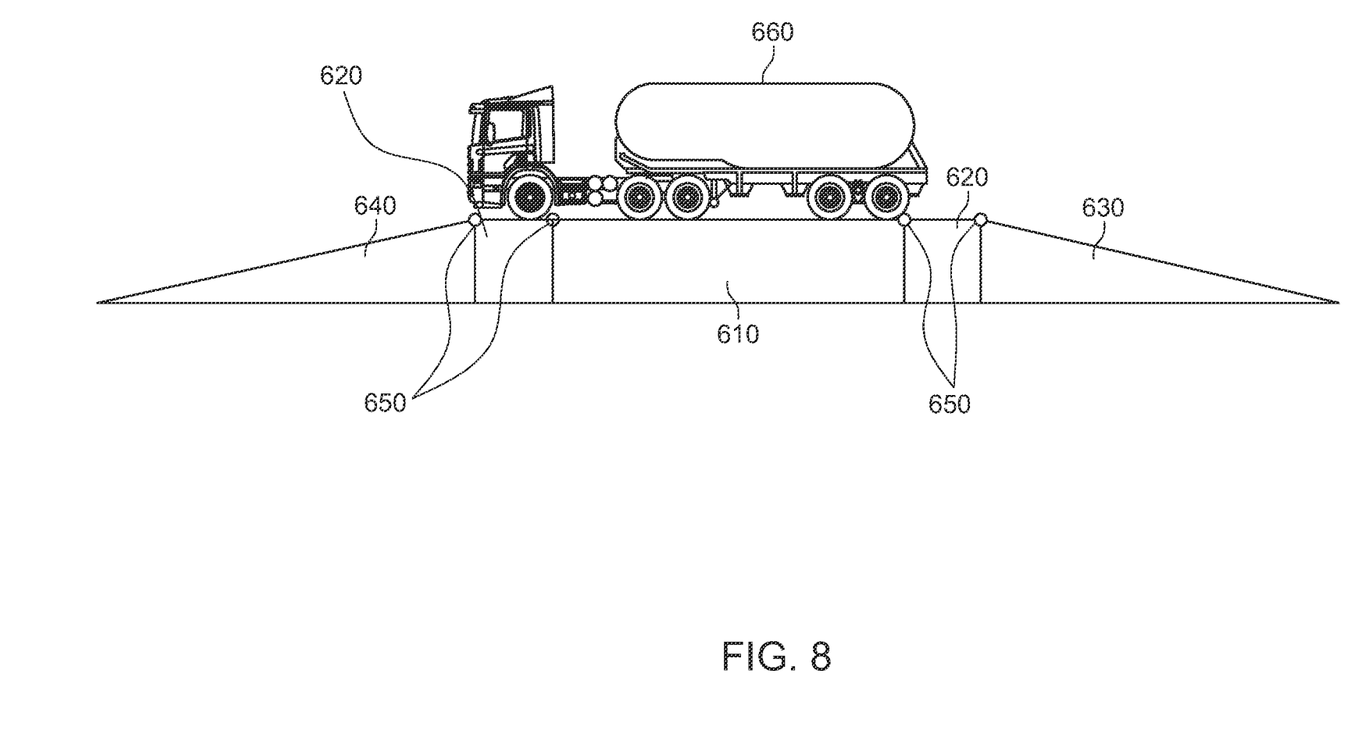
FIG. 8 is an elevation view of a fluid delivery vehicle and primary fluid containment unit in accordance with an alternative embodiment of the present invention.

Referring now to FIG. 8 another embodiment of the present invention is shown. In this embodiment primary fluid receiving unit 610 is connected to modular platform extensions 650. Modular platform extension 620 are also connected to an entry ramp 630 and exit ramp 640. Connections 650 for securing the modular platform extensions 650 to the primary fluid receiving unit 610 and ramps 630, 640 maybe hinges, flanges or other mechanical means of securing the components together. The modular platform extensions 650 may extend to the ground or maybe bridge like structures connected only two a top of the ramps 630, 640 and top of the primary fluid containment unit 610. The modularity of this embodiment enables the length of the receiving structure to be modified to accommodate a longer fluid delivery vehicle 660 as shown in FIG. 8.

The fluid discharge system at the present invention has shown through experimentation to be capable of offloading 110 BBL of water in less than one minute and 45 seconds. As used herein, one BBL means one stock tank barrel, of 42 US gallons liquid volume. Total time for a truck on a pad has shown to be less than three minutes. By eliminating manual hose connections, increasing offload rate and eliminating the need to back up to connections, the present invention will drastically lesson well site costs, improve efficiency, increase safety, and lesson environmental hazards.

As used herein, "including," "containing" and like terms are understood in the context of this application to be synonymous with "comprising" and are therefore open-ended and do not exclude the presence of additional unde-scribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention. As used herein, "forward" or "front" is relative directional term meaning toward the rig portion of a truck as opposed to "rear", "rearward" or "back" which is understood to mean more towards the tank or fluid holding container end of a truck.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A fluid delivery vehicle comprising: a fluid holding container mounted on said vehicle; a vent on an upper portion of the fluid holding container having a means for opening and closing the vent; a primary fluid discharge assembly downwardly extending from the fluid holding container comprising a first discharge port having a first diameter and a first means for opening and closing the primary discharge port; and secondary fluid intake and discharge assembly comprising a secondary discharge port having a second diameter and a means for opening and closing the secondary discharge port; wherein the first diameter of the first discharge port is larger than the second diameter of the secondary discharge port; wherein the first means for opening and closing the primary fluid discharge port and the means for opening and closing the vent are configured to synchronously open and close.

2. The fluid delivery vehicle of claim 1, wherein the primary fluid discharge assembly further comprises a second means for opening and closing the primary discharge port.

3. The fluid delivery vehicle of claim 2, further comprising a compressed air system comprising an air compressor connected to an air storage tank further connected to a pressure regulated air distribution system.

4. The fluid delivery vehicle of claim 3, wherein the first means for opening and closing the primary discharge port is a pneumatically actuated butterfly valve connected pneumatically to the air distribution system, wherein the pneumatically actuated butterfly valve is controlled by a switch remote from the valve.

5. The fluid delivery vehicle of claim 4, wherein the second means for opening and closing the primary discharge port is a pneumatically actuated safety lid connected pneumatically to the air distribution system and wherein the vent is a pneumatically actuated valve and connected to the air distribution system.

6. The fluid delivery vehicle of claim 5, wherein the first means is a fail close pneumatically actuated butterfly valve and wherein the second means for opening and closing the primary discharge port is a fail close pneumatically actuated safety lid.

7. The fluid delivery vehicle of claim 1, wherein a manifold connects the primary fluid discharge assembly and secondary fluid intake and discharge assembly discharge to the fluid holding container.

8. The fluid delivery vehicle of claim 6, wherein the second means for opening and closing the primary discharge port is pneumatically connected to the air distribution system and the first means for opening and closing the primary discharge port is pneumatically connected to the second means for opening and closing the primary discharge port such that compressed air is only available to the first means for opening and closing the primary discharge port when the second means for opening and closing the primary discharge port is in an open position.

9. The fluid delivery vehicle of claim 1, wherein the primary fluid discharge assembly and the secondary fluid intake and discharge assembly are cylindrical.

10. The fluid delivery vehicle of claim 9, wherein the diameter of the primary fluid discharge assembly is at least 10 inches.

* * * * *